N. L. OLSON.
EXTENSION FOR VEHICLES.
APPLICATION FILED MAR. 16, 1917.
1,243,864.
Patented Oct. 23, 1917.
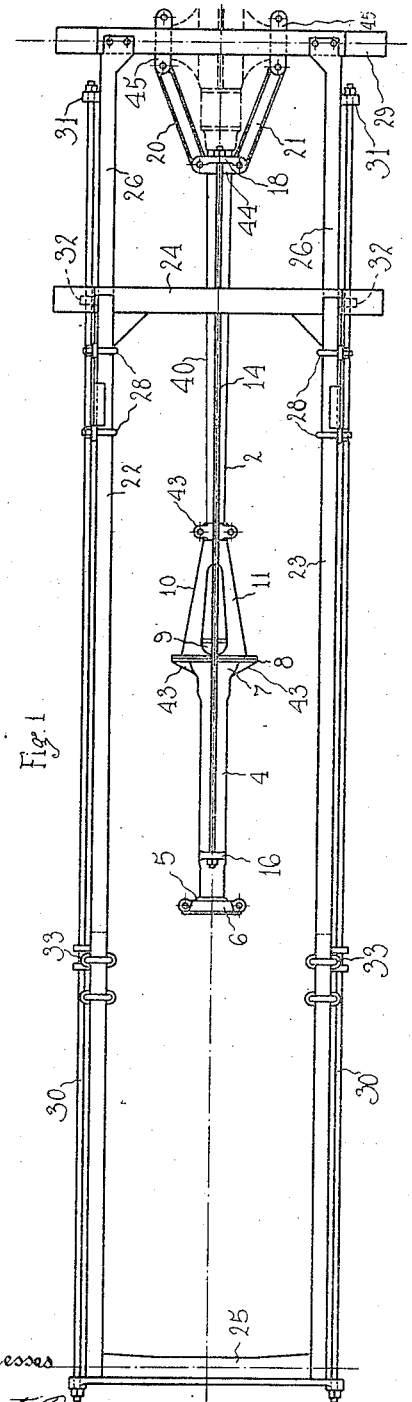
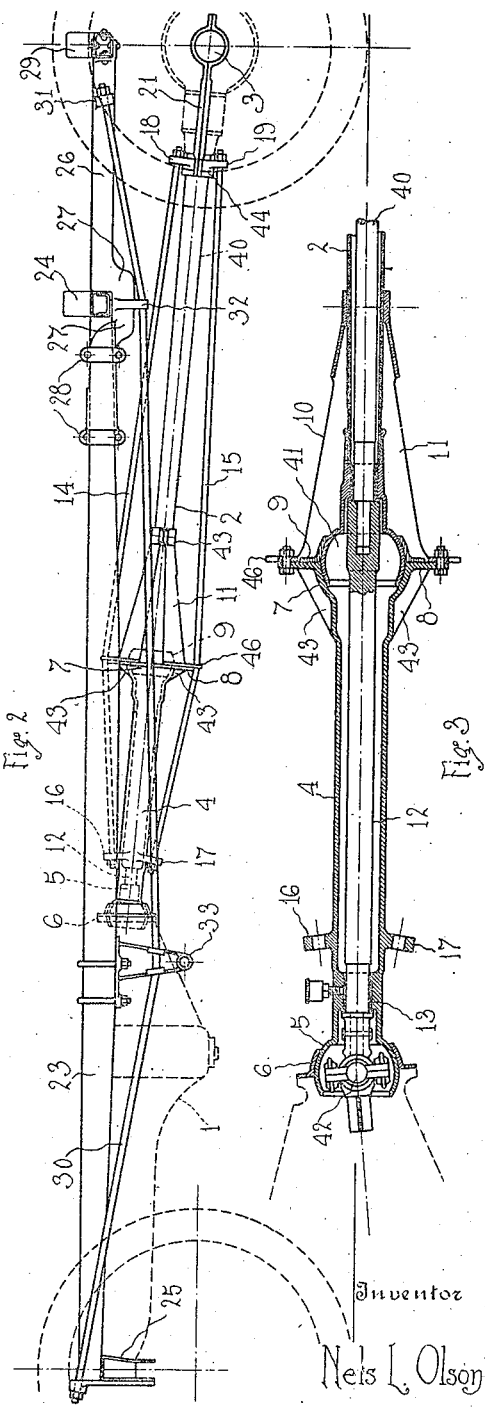
Witnesses
Arthur F. Draper
Karl H. Butler
Inventor
Nels L. Olson
By
Attorneys

UNITED STATES PATENT OFFICE.

NELS L. OLSON, OF DETROIT, MICHIGAN.

EXTENSION FOR VEHICLES.

1,243,864.  Specification of Letters Patent.  Patented Oct. 23, 1917.

Application filed March 16, 1917. Serial No. 155,163.

*To all whom it may concern:*

Be it known that I, NELS L. OLSON, a citizen of the United States of America, residing at Detroit, in the county of Wayne and State of Michigan, have invented certain new and useful Improvements in Extensions for Vehicles, of which the following is a specification, reference being had therein to the accompanying drawings.

This invention relates to a vehicle drive extension, and more particularly to a permanent or fixed drive extension in contradistinction to a drive extension that may be adjusted and used in connection with adjustable vehicle frames or an adjustable chassis extension.

This invention aims to provide an extremely rigid drive extension that may be easily interposed between the usual parts or elements of the driving mechanism of a motor vehicle, by simply separating the usual parts and installing the extension. Provision is made for preventing any oscillation of the extension drive and to prevent any whipping action of the extension, truss rods are employed which tie the extension to the usual drive shaft assembly.

My invention will be hereinafter more fully described and then claimed, and reference will now be had to the drawings, wherein—

Figure 1 is a plan of the drive extension in connection with an extended vehicle frame or chassis;

Fig. 2 is a side elevation of the same; and

Fig. 3 is a longitudinal sectional view of the drive extension.

An ordinary drive shaft assembly includes a transmission casing 1, a detachable cap 6 adapted for holding the ball member 41 of a drive shaft housing 2, said drive shaft housing extending to a rear axle 3 where the drive shaft 40 within the housing is employed for operating a differential mechanism at the rear axle. The forward end of the drive shaft 40 is operatively connected to a universal joint 42 in the ball member 41 of the transmission casing 1. Such is the ordinary drive shaft assembly, but I have shown the drive shaft 40 and its housing separated relative to the transmission casing 1 and the cap 6, with my extension interposed and fixed to provide a rigid structure and at the same time establish a driving connection between the universal joint 42 and the drive shaft 40.

My drive extension comprises a tubular housing extension 4 having a ball member 5 at the forward end thereof adapted to be held by the cap 6 of the transmission casing 1. The ball member 5 takes the usual position and function of the ball member 41. The rear end of the housing extension 4 terminates in a semi-spherical socket 7 having a peripheral flange 8 and connected to this flange is a cap 9 retaining the ball member 41 in the socket 7. The socket 7 and the cap 9 permit of the usual ball member 41 being used.

In the housing extension 4 is an extension shaft 12 having the rear end thereof constructed to receive the forward end of the usual drive shaft 40. The forward end of the extension shaft 12 is journaled in a bearing 13 which coöperates with the usual bearing in the ball member 41 in maintaining the shafts 12 and 40 in longitudinal alinement. The forward end of the drive shaft 12 is connected to the universal joint 42 in the usual and well known manner.

To add rigidity to the housing extension 4 at its juncture with the usual shaft housing 2, conical shaped braces or clamping members 10 and 11 are employed. These clamping members have the rear ends thereof clamped around the usual drive shaft housing 2, as at 43, and the forward ends of said members are suitably connected to the peripheral flange 8 of the housing extension 4, said flange being braced by webs 43. To further strengthen the drive extension relative to the drive shaft housing 2 and obviate any whipping or oscillating action, I employ truss rods 14 and 15. These rods are preferably arranged above and below the drive shaft assembly and the forward ends of said rods are connected to apertured lugs 16 and 17 adjacent the bearing 13 of the housing extension 4, and the rear ends of said truss rods connected to aperture lugs 18 and 19, carried by a clamp 44 on the rear end of the housing 2. The clamp 44 is connected by angularly disposed arms 20 and 21 to clamps 45 on the rear axle housing of the vehicle. The truss rods 14 and 15 engage the peripheral flange 8 or bridge members 46 carried by said flange at the juncture of the extension housing 4 and the housing 2.

Before installing the drive shaft extension, the ordinary drive shaft assembly was used in connection with a vehicle frame or chassis having side frames 22 and 23, a rear member 24 and a front member 25. To permit of this frame or chassis being used when my drive extension is in place, the side frames 22 and 23 have the rear ends thereof provided with extension members 26, said members having stirrup portions 28 providing clearance for the rear member 24. The forward ends of the extension members 26 are connected to the side frames 22 and 23 by U bolts 28 or similar fastening means, and the rear ends of the members 26 are connected by a cross member 29. The cross member is similar to the rear member 24 of the usual vehicle frame or chassis, and is preferably positioned above the rear axle housing of the vehicle.

Tying the chassis extension to the vehicle frame are side truss rods 30 having the forward ends thereof connected to the member 25 and the rear ends thereof connected to apertured lugs 31 carried by the extension members 26 adjacent the cross member 29. The truss rods 30 extend through apertured lugs 32 on the extension members 26 below the rear member 24, and also through hangers 33 carried by the side frames 22 and 23 contiguous to the transmission casing 1.

The truss rods 30 insure rigidity of the vehicle frame or chassis and may be adjusted to compensate for any sagging of the extension members or frame at the rear end of the vehicle frame or chassis, while the truss rods 14 and 15 insure rigidity of the drive extension.

I attach considerable importance to the fact that the frame and drive extensions have been designed as accessories permitting of the frame and drive of pleasure cars being extended so that long bodies can be placed upon the frame, thus converting a pleasure car for commercial purposes, as delivery trucks. No alterations are made in connection with the vehicle frame or the drive, it only being necessary to separate parts of the drive, install my extension and then add the extension frame to the vehicle frame.

What I claim is:—

1. A drive extension for motor vehicles comprising a housing extension adapted to connect the rear end of a transmission casing and the forward end of a drive shaft housing, a shaft extension in said housing extension adapted for connection with a drive shaft in the drive shaft housing, and a universal joint of said transmission casing, and truss rods connecting the forward end of said housing extension to the rear end of the drive shaft housing.

2. The combination with a chassis frame, a transmission casing, a universal joint, a drive shaft housing ordinarily coupled to said transmission casing and a drive shaft in said housing, of an extension interposed between said transmission casing and said drive shaft housing and having the forward end thereof coupled to said transmission casing for universal movement and the rear end rigidly connected to said drive shaft housing independent of said chassis frame, means in said extension rigidly connected to said drive shaft establishing a driving connection between said universal joint and said drive shaft, and means exteriorly of said extension independent of said chassis frame coupling the forward end of said extension to the rear end of said drive shaft housing.

3. The combination with a chassis frame, a transmission casing, a universal joint, a drive shaft housing ordinarily coupled to said transmission casing, and a drive shaft in said housing, of an extension interposed between said transmission casing and said drive shaft housing, a ball member at the forward end of said extension connected to said transmission casing, a socket at the rear end of said extension to receive the forward end of said drive shaft housing, means independent of said chassis frame rigidly connecting said socket to said drive shaft housing, a shaft extension in said extension connecting said drive shaft and said universal joint, means establishing a rigid connection between said drive shaft housing and said extension, and means coupling the forward end of said extension to the rear end of said drive shaft housing and engaging said extension at its junction with said drive shaft housing.

4. Means for converting the chassis and drive shaft assembly of a pleasure vehicle for the purposes of a delivery truck, consisting of interposing a drive shaft extension in the drive shaft assembly to increase the wheel base of the pleasure vehicle, and attaching an extension to the rear end of said chassis so that the chassis has a length equivalent to the wheel base, said drive shaft extension being free of any chassis connection other than a transmission casing.

In testimony whereof I affix my signature in the presence of two witnesses.

NELS L. OLSON.

Witnesses:
KARL H. BUTLER,
ANNA M. DORR.